United States Patent [19]

Yazawa

[11] Patent Number: 4,539,265
[45] Date of Patent: Sep. 3, 1985

[54] MAGNETIC RECORDING MEDIUM

[75] Inventor: Kenji Yazawa, Yokohama, Japan

[73] Assignee: Sony Corporation, Tokyo, Japan

[21] Appl. No.: 540,707

[22] Filed: Oct. 11, 1983

Related U.S. Application Data

[63] Continuation of Ser. No. 367,949, Apr. 13, 1982, abandoned.

[30] Foreign Application Priority Data

Apr. 14, 1981 [JP] Japan .................................. 56-56042
May 29, 1981 [JP] Japan .................................. 56-83031

[51] Int. Cl.³ .............................................. G11B 5/66
[52] U.S. Cl. .................................... 428/621; 360/134;
360/135; 360/136; 427/131; 427/132; 428/216;
428/336; 428/161; 428/209; 428/693; 428/694;
428/900; 428/928; 428/678
[58] Field of Search ............... 428/900, 692, 693, 694,
428/678, 621, 642, 635, 668, 928, 161, 209, 216,
336; 427/132, 131; 360/134–135

[56] References Cited

U.S. PATENT DOCUMENTS

| 4,118,704 | 10/1978 | Ishino | 428/900 |
| 4,127,884 | 11/1978 | Nouchi | 428/900 |
| 4,226,691 | 10/1980 | Cunningham | 428/900 |
| 4,356,066 | 10/1982 | Kienle | 428/900 |

FOREIGN PATENT DOCUMENTS 56-34142  4/1981  Japan .................................. 428/900

Primary Examiner—Ellis P. Robinson
Attorney, Agent, or Firm—Hill, Van Santen, Steadman & Simpson

[57] ABSTRACT

A magnetic recording medium is disclosed which includes a non-magnetic substrate, a first layer made of bismuth formed on the substrate in a discontinuous island shape, and a ferromagnetic metal layer formed over the first layer and the substrates and also a magnetic recording medium is disclosed which includes a non-magnetic substrate, a first layer formed continuously covering the substrate made of amorphous silicon and/or silicon compound, a second layer made of bismuth formed on the substrate in a discontinuous island shape and a ferromagnetic metal layer formed over the first and second layers.

6 Claims, 7 Drawing Figures

MAGNETIC RECORDING MEDIUM

This application is a continuation of Ser. No. 06/367,949, filed Apr. 13, 1982, now abandoned.

BACKGROUND OF THE INVENTION

1. Field of the Invention

The present invention generally relates to a magnetic recording medium, and more particularly relates to a magnetic recording medium having a ferromagnetic metal thin film as a magnetic recording layer on a non-magnetic substrate.

2. Description of the Prior Art

A conventional magnetic recording medium is provided in such a manner that a magnetic paint composed mainly of an acicular ferromagnetic powder such as gamma -ferric oxide ($\gamma$-Fe$_2$O$_3$, chromium dioxide CrO$_2$, Fe-Co alloy powder or the like and a polymeric binder is coated on a non-magnetic substrate to form a magnetic recording layer.

Whereas, such a magnetic recording medium is worthwhile to be noticed in which a ferromagnetic metal thin film is formed on a non-magnetic substrate through the use of technique of vacuum evaporation, sputtering or ion plating and so on of ferromagnetic metal or alloy and this film is used as a magnetic recording layer. Since the magnetic recording medium of this ferromagnetic metal thin film type utilizes no binder, it can increase the packing density of magnetic material, and hence even if the magnetic recording layer is made thin, it is possible to obtain a magnetic recording medium having a high residual magnetic flux density. In addition, since the magnetic material layer thereof is formed as a thin layer, upon recording a short wavelength signal, it is also possible to provide a magnetic recording medium which is particularly excellent in sensitivity for such short wavelength signal and therefore it is quite desirable for high density magnetic recording.

As a method for forming a magnetic recording medium of such ferromagnetic metal thin film type, known in the prior art is a so-called oblique evaporation method. This is a method in which vapors of ferromagnetic metal such as Fe and Co are obliquely incident on a non-magnetic substrate, thereby depositing and growing it on the non-magnetic substrate. In accordance with this oblique evaporation method, it is possible to obtain a magnetic recording medium having a high coercive force. But, to obtain a high coercive force, vapor particle beams of such as Fe and Co have to be incident on the non-magnetic substrate with an incident angle in a range from 40° to 80°, the deposition is poor in efficiency and hence productivity is low. But, unless the above obilique evaporation method is utilized, it is difficult to provide a magnetic recording medium having a high coercive force. Since, for example, cobalt has a high crystalline magnetic anisotropy, cobalt is appreciated as a magnetic material to provide a magnetic layer having a high coercive force. Nevertheless, if cobalt is merely evaporated, that is, a Co vapor beam is introduced to the major surface of a non-magnetic substrate substantially perpendicular so as to form a Co layer or film, the coercive force of that Co layer is less than 100 Oe. Thus such low coercive force as mentioned above is not suitable for use in the high density magnetic recording medium.

To form a magnetic material layer having a high coercive force independent of such above oblique evaporation method, there is proposed such a method that a magnetic metal layer is not directly formed on the non-magnetic substrate but instead, an under layer is formed between the non-magnetic substrate and the magnetic metal layer. As an example of the magnetic recording medium having an under layer such magnetic recording medium is known in which an under layer is formed by evaporating chromium as an under layer and cobalt is deposited on the under layer by the evaporation thereof. But, the magnetic characteristic of the magnetic recording medium thus constructed is apt to be influenced by the substrate temperature at which the magnetic metal layer is evaporated. For example, if a coercive force greater than 400 Oe is presented by utilizing cobalt having a thickness of 400 Å as an upper layer, it is necessary to heat the substrate up to 300° C. Accordingly, when a magnetic material layer having a coercive force more. than 400 Oe is formed on a non-magnetic substrate, it was difficult to use a polymeric film such as polyethylene terephthalate having poor heat resistance property as the non-magnetic substrate.

OBJECTS AND SUMMARY OF THE INVENTION

It is an object of the present invention to provide an improved magnetic recording medium having a magnetic recording layer formed of a ferromagnetic metal thin film.

It is another object of the present invention to provide a magnetic recording medium having a high coercive force.

It is a further object of the present invention to provide a magnetic recording medium having isotropic magnetic characteristic in a plane of a magnetic recording layer.

It is a still further object of the present invention to provide a magnetic recording medium having a construction in which a non-magnetic substrate has a poor heat resistance.

It is a yet further object of the present invention to provide a magnetic recording medium which can be manufactured with high efficiency of raw material.

According to one aspect of the present invention, there is provided a magnetic recording medium comprising:

a non-magnetic substrate;

a first layer made of bismuth formed on said substrate in a discontinuous island shape; and a ferromagnetic metal layer formed over said first layer and said substrate.

According to another aspect of the present invention, there is provided a magnetic recording medium comprising:

a non-magnetic substrate;

a first layer formed on continuously covering said substrate made of amorphous silicon and/or silicon compound;

a second layer made of bismuth formed on said substrate in a discontinuous island shape; and a ferromagnetic metal layer formed over said first and second layers.

The other objects, features and advantages of the present invention will become apparent from the following description. taken in conjunction with the accompanying drawings through which the like references designate the same elements and parts.

DESCRIPTION OF THE PREFERRED EMBODIMENTS

A magnetic recording medium according to the present invention includes a structure of a magnetic thin film which is formed of double-layer structure film formed of an under layer made of bismuth Bi which is formed on a non-magnetic substrate and a magnetic metal thin film, for example, cobalt Co layer formed on the under layer. By this arrangement, it is possible to provide a magnetic recording medium with a high coercive force. Further, in order to obtain such magnetic recording medium more surely and stably, in the magnetic recording medium having the construction as set forth above, it is further arranged in such a manner as to form a continuous film or layer made of silicon or silicon compound between the non-magnetic substrate and the discontinuous under layer made of bismuth.

Figure 1:
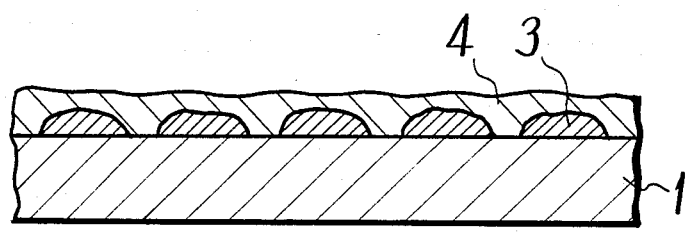
FIGS. 1 and 3 are respectively schematic diagrams each showing a cross-section of a magnetic recording medium according to the present invention.

FIG. 1 is an enlarged cross-sectional diagram schematically showing one example of a magnetic recording medium according to the present invention. In FIG. 1, an under layer 3 made of bismuth Bi is deposited on one major surface of a non-magnetic substrate 1 as in a discontinuous island shape on which a ferromagnetic metal layer 4 is evaporated, thus constructing a magnetic recording medium. As the non-magnetic substrate 1, it is possible to utilize polymeric film (polyimide, polyethyleneterephthalate and so on), glass, ceramics, or metal plate, a surface of which is oxidized and so forth. A substrate temperature Ts upon deposition of ferromagnetic metal by vacuum evaporation is important and it is desired that the substrate temperature Ts is selected in a range between 130° C. and the melting point of bismuth Bi. When bismuth Bi is evaporated on the substrate at this substrate temperature Ts, the under layer 3 made of bismuth Bi is deposited on the non-magnetic substrate 1 like a discontinuous island shape.

Figure 2:
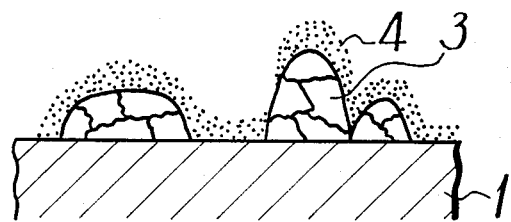
FIG. 2 is a diagram schematically showing a result in observing a cross-section of a magnetic recording medium according to the present invention through the use of an electron microscope.

FIG. 2 shows the state in which the substrate temperature Ts is held at, for example, about 150° C. and the bismuth Bi under layer 3 and the metal layer such as cobalt Co layer 4 are deposited by vacuum evaporation on the non-magnetic substrate 1. More specifically, as shown in FIG. 2, the bismuth Bi under layer 3 is deposited in a discontinuous island shape each of which is round-shaped and also the cobalt Co layer 4 is formed over the island-like bismuth Bi under layer 3 and the surface of the non-magnetic substrate 1 which is in part exposed. In this case, FIG. 2 schematically shows a result obtained in observing a cross-section of the magnetic recording medium through the use of an electron microscope.

Whereas, when the substrate temperature Ts is less than 100° C., the bismuth Bi under layer is deposited on the non-magnetic substrate as a continuous film with innumerable cracks, on which the cobalt Co layer is continuously deposited. Then, when the substrate temperature Ts is 100° C. or below, the coercive force Hc is low in a range from about 100 Oe to 150 Oe, which indicates the fact that the effect of the bismuth Bi under layer 3 is not remarkable. But, when the substrate temperature Ts is more than about 130° C., the coercive force Hc becomes high and hence the effect of the bismuth Bi under layer 3 becomes great.

The mean film thickness of the bismuth Bi under layer 3 is selected to be more than 10 Å but less than 1000 Å (1 $\mu g/cm^2$ to 100 $\mu g/cm^2$), more preferably, more than 100 Å but less than 1000 Å (10 $\mu g/cm^2$ to 100 $\mu g/cm^2$), where the values in the above parentheses are the values when the mean film thickness is calculated by bismuth amount per 1 $cm^2$.

Further it is recommended that the film thickness of the ferromagnetic metal layer 4 is selected to be more than 100 Å but less than 1000 Å, more desirably, more than 250 Å but less than 500 Å. If the above film thickness is less than 100 Å, the magnetization amount is not enough. Also, if it is beyond 1000 Å, the coercive force Hc and the rectangular ratio Rs are deteriorated. In this case, the film thickness of the cobalt Co layer 4 is the film thickness calculated from the magnetization amount of the cobalt Co layer.

With respect to the magnetic recording medium thus composed, when the substrate temperature Ts is between 130° C. and the melting point of bismuth Bi, the mean film thickness of the bismuth Bi under layer 3 is in a range from 10 Å to 1000 Å and the film thickness of the ferromagnetic metal layer 4, for example, the cobalt Co layer is in a range from 100 Å to 1000 Å, it is possible to obtain a magnetic layer having a coercive force Hc ranging from 500 Oe to 1000 Oe and a rectangular ratio Rs ranging from 0.60 to 0.65. In particular, since the effect of the bismuth Bi under layer 3 becomes remarkable and the high coercive force Hc is obtained, even when the substrate temperature is 130° C., it is possible to utilize even a polymeric film such as polyethyleneterephthalate, which has relatively poor heat resistance, as the non-magnetic substrate, so that the freedom in selecting the non-magnetic material can be widened. In addition, it is possible to use this magnetic recording medium as a magnetic disk since the magnetic characteristics are isotropic in the plane of the magnetic layer.

Figure 3:
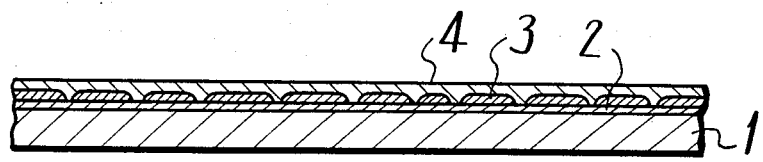

FIG. 3 schematically shows another example of a magnetic recording medium according to the present invention in which in the example of FIG. 1, an amorphous continuous film made of silicon or silicon compound is interposed between the non-magnetic substrate and the discontinuous film made of bismuth Bi. That is, a magnetic recording medium of this example is provided in which an amorphous continuous film 2 made of silicon Si or silicon compound is formed on a non-magnetic substrate 1, a bismuth Bi layer 3 is formed in a discontinuous island shape on this film 2 and a magnetic metal thin film 4 such as a cobalt Co film is formed on the layer 3 as a magnetic layer.

The layer of silicon or silicon compound can be deposited on the non-magnetic substrate, by vacuum evaporation, sputtering and so on, to form a continuous layer having a thickness from 50 Å to 500 Å. The material of the layer may be silicon, or silicon compound, such as SiO₂, Si₃N₄, and SiC. The reason why the film thickness of the amorphous continuous film 2 is selected in a range from 50 Å to 500 Å is that if it is less than 50 Å, the continuous film is quite difficult to obtain, while if it is beyond 500 Å, the film 2 becomes crystallized, and the film thickness occupied by the non-magnetic part of the medium becomes too large.

Even in the magnetic recording medium illustrated in FIG. 3, the discontinuous film 3 made of bismuth Bi and the magnetic metal thin film 4 which are formed on the amorphous continuous layer 2 are constructed in a manner same as mentioned before.

Figure 4:
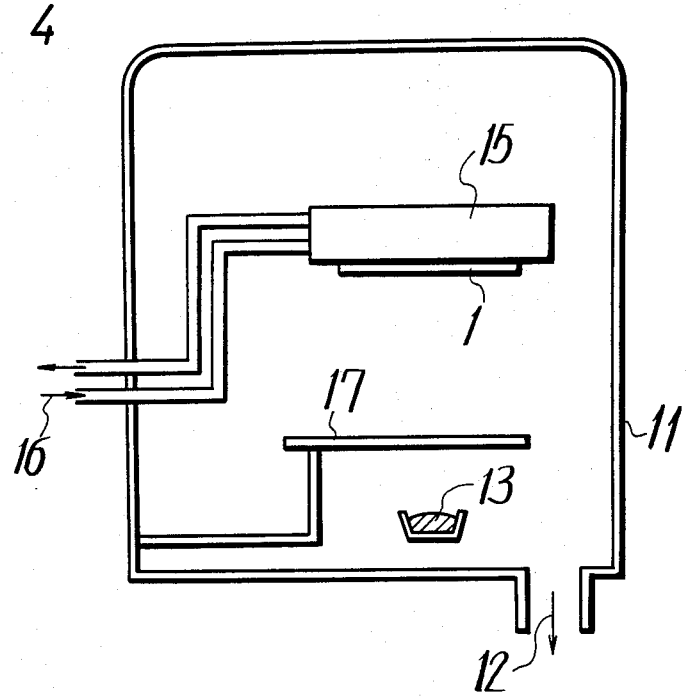
FIG. 4 is a diagram schematically showing an example of the apparatus for manufacturing a magnetic recording medium according to the present invention.

FIG. 4 shows an outline of an apparatus which is employed in manufacturing a magnetic recording medium of the present invention. In the figure, reference numeral 11 generally denotes a vacuum chamber whose pressure is made as, for example, $10^{-6}$ to $10^{-7}$ Torr through an exhaustion 12 of a vacuum pump. Within this vacuum chamber 11 are disposed an evaporating source 13 and a non-magnetic substrate 1 which is to be deposited. This non-magnetic substrate 1 is supported by a substrate holder 15 and is kept in a predetermined substrate temperature by a heating medium 16 supplied to the substrate holder 15. The evaporation source 13 is heated and evaporated by an electronic beam heating method. In this case, the evaporation source 13 may be also evaporated on the basis of a resistance heating method and a high frequency induction heating method. Further, a shutter 17 is placed between the non-magnetic substrate 1 and the evaporation source 13.

Figure 5:
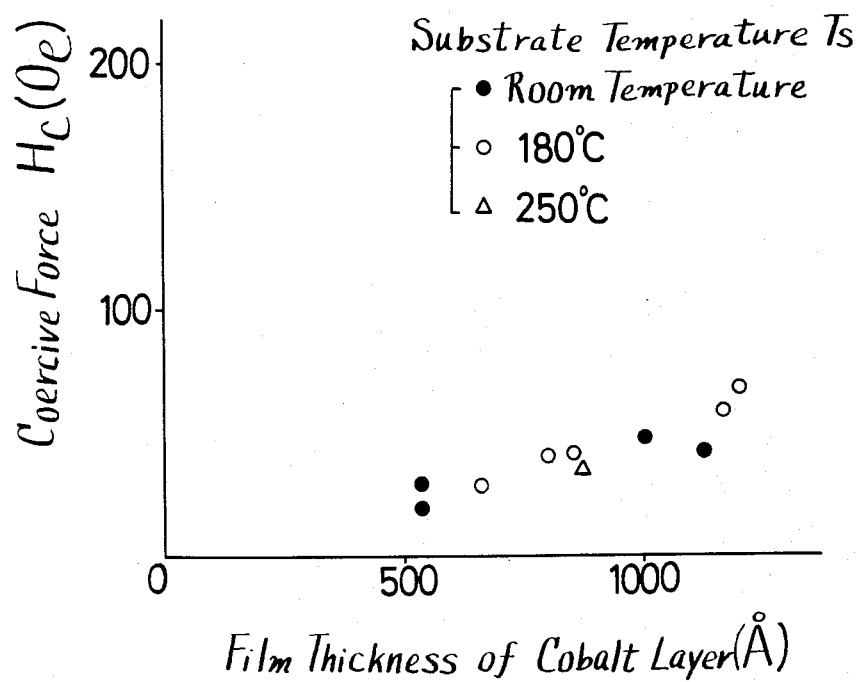
FIG. 5 is a graph showing the magnetic characteristic of a conventional magnetic recording medium.

First, as a comparision example for the present invention, let us consider the result in measuring a magnetic characteristic (coercive force Hc) as illustrated in FIG. 5 in the case where a magnetic recording medium is prepared by directly evaporating a metal cobalt on the non-magnetic substrate 1 through the use of the apparatus as set forth above. In the graph of FIG. 5, there is shown that a value of coercive force Hc relative to a film thickness of a cobalt Co layer is plotted each time when the substrate temperature Ts of the non-magnetic substrate 1 is changed as in a room temperature (shown by mark ●), 180° C. (shown by mark O) and 250° C. (shown by mark △), respectively, where the film thickness of the cobalt Co layer indicated on the abscissa is a value calculated from a measured value of a magnetization of the deposited layer. As will be apparent from FIG. 5, the value of the coercive force Hc where the metal cobalt is directly deposited on the non-magnetic substrate 1 is low, that is, less than 100 Oe irrespective of the substrate temperature Ts.

Next, an explanation will be given to each of examples of the magnetic recording medium of the invention which is similarly provided by evaporating the bismuth Bi under layer on one major surface of the non-magnetic substrate 1 on which the cobalt Co layer is subsequently evaporated through the use of the above apparatus. In the following examples 1 through 7, a polyimide film of 50 μm thick is utilized as a non-magnetic substrate 1.

EXAMPLE 1

The substrate temperature Ts of the non-magnetic substrate 1 was selected as 150° C. and the bismuth Bi under layer having a mean film thickness of 1000 Å and a cobalt Co layer having a mean film thickness of 370 Å were deposited sequentially on the substrate 1. The magnetic characteristics of this magnetic recording medium were presented such that the coercive force Hc=580 Oe and the rectangular ratio Rs=0.65.

EXAMPLE 2

The substrate temperature Ts of the non-magnetic substrate 1 was selected as 150° C. and the bismuth Bi under layer with the mean film thickness of 1000 Å and the cobalt Co layer with the film thickness of 520 Å were deposited in sequence. The magnetic characteristics of this magnetic recording medium were presented such that the coercive force Hc=440 Oe and the rectangular ratio Rs=0.52.

EXAMPLE 3

The substrate temperature Ts of the non-magnetic substrate 1 was selected to be 150° C. and the bismuth Bi under layer having the mean film thickness of 1000 Å and the cobalt Co layer with the film thickness of 780 Å were evaporated in turn. The magnetic characteristics of this magnetic recording medium were presented such that the coercive force Hc=360 Oe and the rectangular ratio Rs=0.44.

Figure 6:
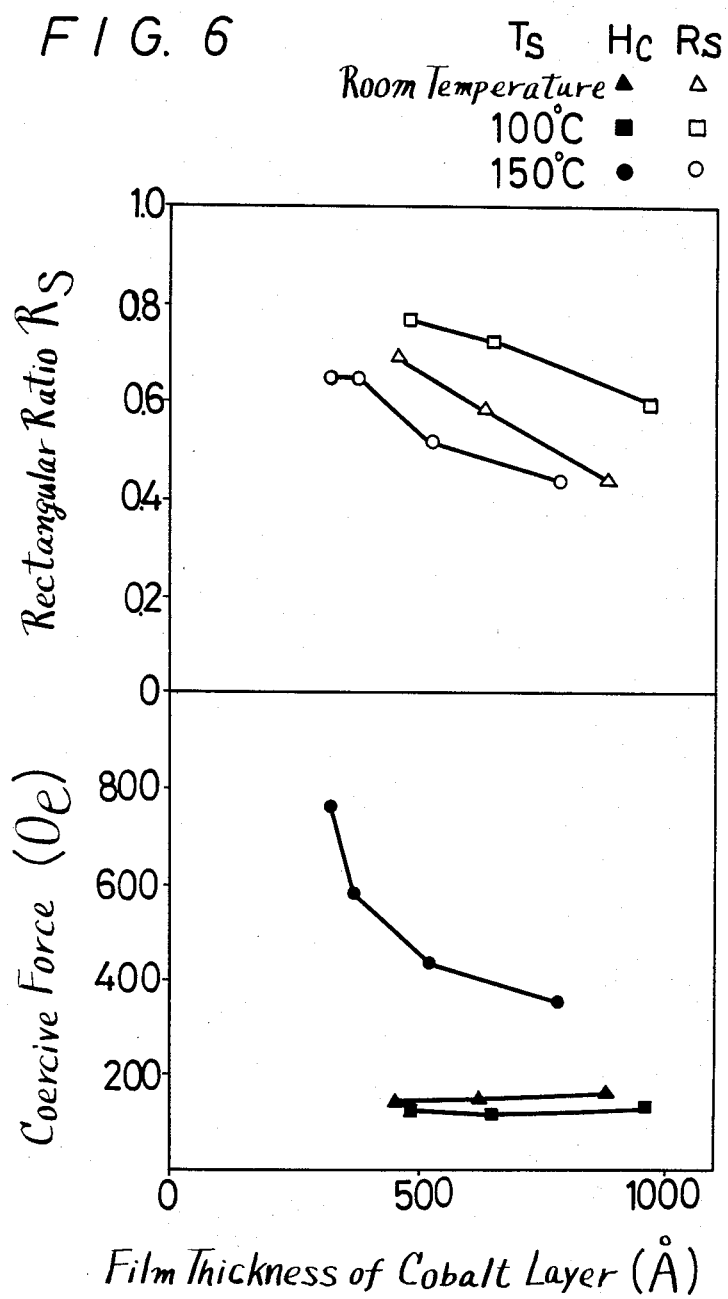
FIGS. 6 and 7 are graphs each showing the magnetic characteristic of a magnetic recording medium according to the present invention.

While in the above examples 1 to 3 the substrate temperature Ts was selected as 150° C., results of other examples where the substrate temperature Ts was changed at the room temperature and at 100° C., and of which the magnetic characteristics of the rectangular ratio Rs and the coercive force Hc are shown in FIG. 6. In these cases, the mean film thickness of the bismuth Bi under layer of each case is selected as 1000 Å. Also, the substrate temperature Ts for each case is represented such that when it is at room temperature, it is indicated by marks ▲ and △, when at 100° C., it is indicated by marks ■ and □ and when at 150° C., it is indicated by marks ● and O in FIG. 6. As will be understood from the graph of FIG. 6, when the substrate temperature Ts is at the room temperature and at 100° C., the coercive force Hc is lowered.

EXAMPLE 4

The substrate temperature Ts of the non-magnetic substrate 1 was selected as 150° C. and the bismuth Bi under layer having the mean film thickness of 500 Å and the cobalt Co layer having the film thickness of 550 Å were sequentially deposited. The magnetic characteristics of this magnetic recording medium were presented such that the coercive force Hc=600 Oe and the rectangular ratio Rs=0.63.

EXAMPLE 5

The substrate temperature Ts of the non-magnetic substrate 1 was selected as 150° C. and the bismuth Bi under layer having the mean film thickness of 500 Å and the cobalt Co layer having the film thickness of 230 Å were deposited in turn. The magnetic characteristics of this magnetic recording medium were provided such that the coercive force Hc=1070 Oe and the rectangular ratio Rs=0.64.

EXAMPLE 6

The substrate temperature Ts of the non-magnetic substrate 1 was selected as 150° C. and the bismuth Bi under layer having the mean film thickness of 100 Å and the cobalt Co layer having the film thickness of 270 Å were deposited in sequence. The magnetic characteristics of this magnetic recording medium were provided such that the coercive force Hc=700 Oe and the rectangular ratio Rs=0.70.

Figure 7:
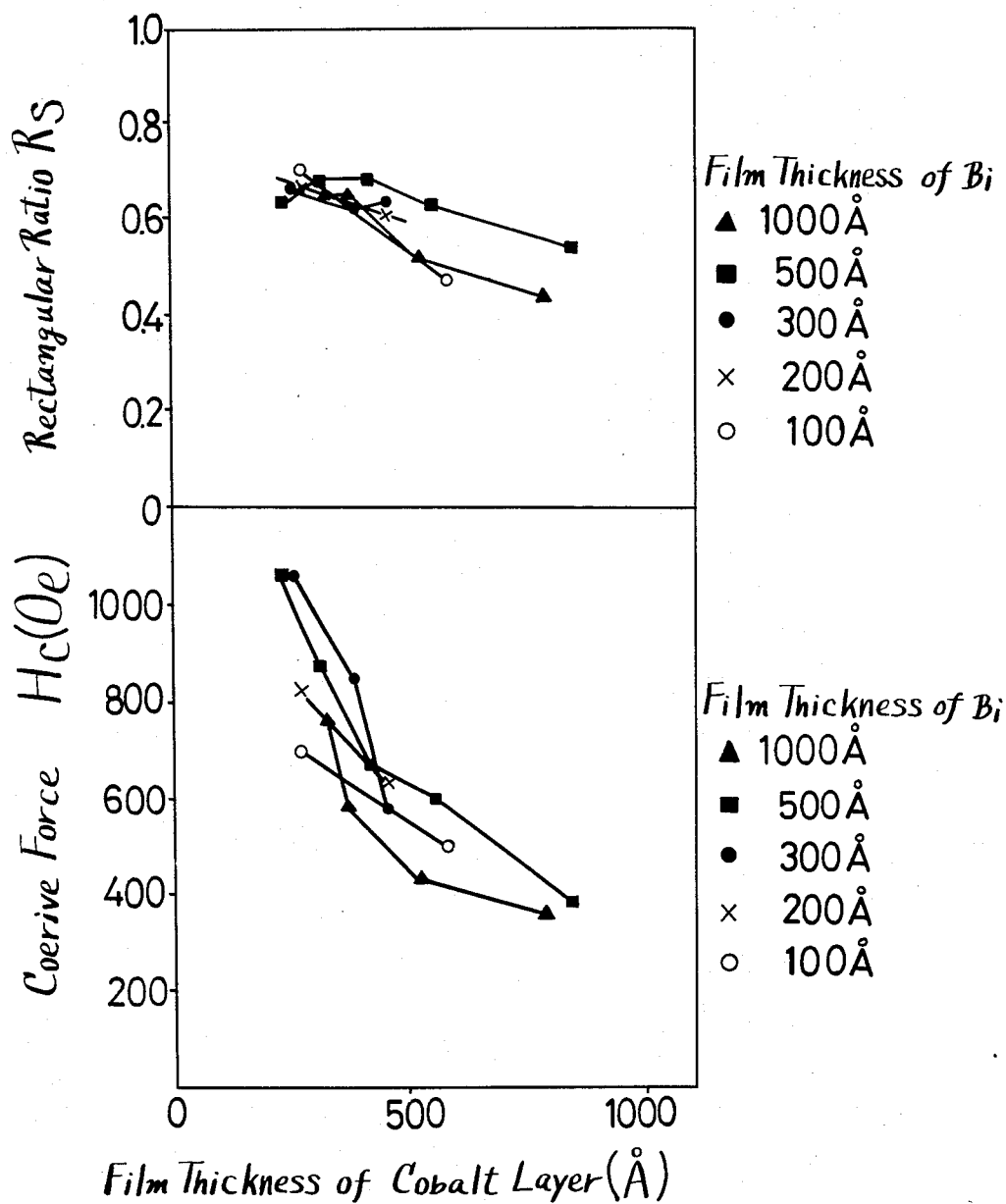

In addition to the above examples 4 through 6, let us consider the results of other examples in which the substrate temperature Ts was selected constant at 150° C. and the film thickness of the bismuth Bi under layer and the cobalt Co layer were respectively varied, together with the magnetic characteristics of the rectangular ratio Rs and coercive force Hc as illustrated in FIG. 7, where marks ▲, ■, ●, X and O respectively indicate the cases when the mean film thickness of the bismuth Bi under layer is given as 1000 Å, 500 Å, 300 Å, 200 Å and 100 Å. As will be obvious from FIG. 7, even in the case where the mean film thickness of the bismuth Bi under layer was changed in a range from 100 Å to 1000 Å, the dependency of the coercive force Hc and the rectangular ratio Rs on the thickness of the cobalt Co layer indicates similar tendency, in which as the film thickness of the cobalt Co layer becomes thinner, the coercive force Hc and the rectangular ratio Rs are increased together. Thus the result in which even if the film thickness of the bismuth Bi under layer is selected to be thin as 100 Å, the coercive force Hc is raised high enough indicates the fact that when a plurality of magnetic thin films are superposed to obtain a desired magnetic flux density, it becomes possible to reduce the non-magnetic bismuth Bi under layer occupying the magnetic recording medium and hence it becomes advantageous to obtain a magnetic recording medium having a high magnetic flux density.

EXAMPLE 7

The substrate temperature Ts of the non-magnetic substrate 1 was selected to be 200° C. and the bismuth Bi under layer having the mean film thickness of 200 Å and the cobalt Co layer having the film thickness of 330 Å were deposited in turn. The magnetic characteristics of this magnetic recording medium were presented in which the coercive force Hc=550 Oe and the rectangular ratio Rs=0.64.

In this case, it was noted that even when the substrate temperature Ts is at 200° C., the coercive force Hc is increased.

EXAMPLE 8

A magnetic recording medium was prepared in which the amorphous continuous film 2 made of silicon Si with a film thickness of 100 Å was deposited on the non-magnetic substrate made of polyester (polyethyleneterephthalate) film, the bismuth Bi layer 3 is deposited on the film 2 in a discontinuous island shape with a mean film thickness of 200 Å, and a magnetic metal thin film 4 made of cobalt Co with the film thickness of 500 Å is further deposited on the film 3 through the use of the apparatus shown in FIG. 4 when the temperature of the substrate is selected to be 150° C. The magnetic recording medium according to this example 8 indicates its magnetic characteristics in which the coercive force Hc was 880 Oe and the rectangular ratio Rs was 0.73.

EXAMPLE 9

Instead of the amorphous continuous film 2 made of silicon Si film in a above example 8, the film made of $SiO_2$ and having the film thickness of 100 Å was employed. The magnetic characteristics of the magnetic recording medium according to the example 9 were presented in which the coercive force Hc was 605 Oe and the rectangular ratio Rs was 0.66.

EXAMPLE 10

Instead of the amorphous continuous film 2 made of silicon Si film in a example 8, the layer made of $Si_3N_4$ and having a film thickness of 100 Å was used. The magnetic characteristics of the magnetic recording medium according to this example 10 were presented in which the coercive force Hc was 860 Oe and the rectangular ratio Rs was 0.73.

EXAMPLE 11

A magnetic recording medium was prepared in which after a layer made of $SiO_2$ and having a film thickness of 300 Å is deposited on the non-magnetic substrate formed on aluminum Al plate, the bismuth Bi film with the mean film thickness of 300 Å was deposited thereon so as to form the layer in the form of the discontinuous island and the cobalt Co layer with the film thickness of 500 Å was deposited thereon. The magnetic characteristics of the magnetic recording medium thus composed were presented in which the coercive force Hc was 790 Oe and the rectangular ratio Rs was 0.64.

EXAMPLE 12

A magnetic recording medium was provided in which a layer made of SiC and having a film thickness of 100 Å was deposited on the polyester film as the amorphous continuous film, a bismuth Bi film with a mean film thickness of 200 Å was deposited thereon so as to form a layer of a discontinuous island shape and a cobalt Co film with the film thickness of 500 Å was deposited thereon. In this case, the coercive force Hc was 750 Oe and the rectangular ratio Rs was 0.66.

As described above, in accordance with the present invention, forming the magnetic thin film as the double -layer structure made of cobalt Co and bismuth Bi, it is possible to obtain the magnetic recording medium with high coercive force easily. In this case, since when the substrate temperature upon deposition is at as low as 130° C. the effect of the bismuth Bi under layer already becomes remarkable and the magnetic recording medium with high coercive force can be provided, then it is possible to utilize the polymeric film such as polyethyleneterephthalate which has relatively poor heat resistance, as the raw material of the non-magnetic substrate.

Further, when the polymeric film is employed as the non-magnetic substrate, since the bismuth layer having a low boiling point (1560° C.) is firstly deposited on the polymeric film as a first layer, the heating power required upon evaporating bismuth is small or little and hence heat radiation upon the polymeric film is small. Next, although since the cobalt Co which is deposited on the bismuth layer as a second layer has a high boiling point (about 3100° C.), the heating power required for evaporation is large and therefore the heat radiation is strong, due to the bismuth Bi layer deposited on the substrate the heat radiation radiated directly upon the polymeric film and a chance of heat deformation of the polymeric film is substantially avoided.

In addition, in the present invention, when the amorphous continuous film made of silicon Si or the silicon compound is formed between the non-magnetic substrate and the bismuth discontinuous film, since it is possible to provide a magnetic recording medium with excellent magnetic characteristics regardless of the base material, in accordance with the modes of various usages and their purposes, the non-magnetic substrate can be constructed by inexpensive raw materials. In other words, in the magnetic recording medium according to the present invention, since the amorphous layer, particularly the silicon layer or the silicon compound layer 2 which can be easily formed as an amorphous layer is formed on the non-magnetic substrate, it is possible to avoid the influence by crystallographic condition of the non-magnetic substrate. Then, under this condition, since the bismuth Bi layer is evaporated and then the magnetic metal thin film made of cobalt Co is deposited thereon, it seems that orientation of, for example, cobalt Co formed thereon can be performed more effectively by the discontinuous layer made of bismuth Bi.

In this case, although the above examples are the cases where the magnetic recording medium is provided in which the magnetic thin film having the double-layer structure formed of the bismuth Bi under layer and the cobalt Co layer is deposited on the non-magnetic substrate, and the magnetic thin film having the triple-layer structure formed of the silicon Si layer, the bismuth Bi under layer and the cobalt Co layer is deposited on the non-magnetic substrate, in order to obtain a desired amount of the magnetic flux density, the double layer structure formed of the bismuth Bi layer and the cobalt Co layer or the triple-layer structure formed of the silicon Si layer, the bismuth Bi layer and the cobalt Co layer can be superposed until the desired magnetic flux density is obtained. By way of example, to obtain the magnetic characteristics such that the coercive force Hc is not less than 500 Oe (Hc≧500 Oe) and the rectangular ratio Rs is not less than 0.60 (Rs≧0.6), the film thickness of the cobalt layer is desirable to be less than 500 Å, but when the magnetic flux density is not enough, it can be formed as the multilayer.

In addition, instead of bismuth Bi, if antimony Sb or thallium Tl is employed, similar effects to the present invention can be achieved.

Although in the above examples the cobalt single body is used as the magnetic metal thin film, it is possible to utilize other magnetic metal thin film, for example, Co-Ni alloy or the like. In this case, if a mixed ratio, that is, for example, a containing amount of nickel Ni in Co-Ni alloy is selected in a range from 30 to 50 atomic %, a higher coercive force can be provided and it is also possible to obtain the magnetic layer which is excellent in corrosion resistance.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A magnetic recording medium comprising:
   a non-magnetic substrate;
   a first layer made of bismuth having a thickness of from 10 to 1000 Angstroms formed on said substrate in a discontinuous island shape; and
   a ferromagnetic metal layer having a thickness of from 100 to 1000 Angstroms formed over said first layer and said substrate, said medium having isotropic magnetic characteristics in the plane of the ferromagnetic metal layer.

2. A magnetic recording medium comprising:
   a non-magnetic substrate;
   a first layer formed continuously covering said substrate made of amorphous silicon and/or silicon compound having a thickness of from 50 to 500 Angstroms;
   a second layer having a thickness of from 100 to 1000 Angstroms made of bismuth formed on said first layer in a discontinuous island shape; and
   a ferromagnetic metal layer having a thickness of from 100 to 1000 Angstroms formed over said second layer, said medium having isotropic magnetic characteristics in the plane of the ferromagnetic metal layer.

3. A magnetic recording medium comprising:
   a non-magnetic substrate,
   a first layer composed of bismuth in a discontinuous island shape having a thickness between 10 Å and 1000 Å on said non-magnetic substrate, and
   a ferromagnetic layer having a thickness of from 100 to 1000 Angstroms formed over said first layer by vapor deposition of ferromagnetic metal in a direction normal to a surface of said substrate, said recording medium having isotropic magnetic characteristics in the plane of the ferromagnetic layer.

4. A magnetic recording medium according to claim 2 and 3, wherein said ferromagnetic metal layer is formed of cobalt or cobalt alloy.

5. A magnetic recording medium according to claim 2 and 3, wherein said first layer and said ferromagnetic metal layer result from deposition of said layers at a substrate temperature higher than 130° C.

6. A magnetic recording medium according to claim 2, wherein said first layer is made of a material selected from Si, $SiO_2$, $Si_3N_4$, and SiC.

* * * * *